United States Patent [19]
Miki et al.

[11] Patent Number: 5,107,481
[45] Date of Patent: Apr. 21, 1992

[54] RECORDING AREA MANAGEMENT SYSTEM FOR WRITABLE TYPE OPTIONAL DISK

[75] Inventors: Tadashi Miki, Osaka; Masayuki Kozuka, Moriguchi, both of Japan

[73] Assignee: Matsushita Electric Industrial Co., Ltd., Osaka, Japan

[21] Appl. No.: 322,428

[22] Filed: Mar. 13, 1989

[30] Foreign Application Priority Data

Mar. 16, 1988 [JP] Japan ................................. 63-62404
Mar. 16, 1988 [JP] Japan ................................. 63-62405

[51] Int. Cl.$^5$ .............................................. G11B 7/00
[52] U.S. Cl. ...................................... 369/59; 369/58; 360/48
[58] Field of Search ................... 369/48, 59, 47, 53, 369/32, 58; 360/48, 39, 57, 69, 72.1, 72.2

[56] References Cited

U.S. PATENT DOCUMENTS

| | | | |
|---|---|---|---|
| 4,733,386 | 3/1988 | Shimoi | 369/47 X |
| 4,775,969 | 10/1988 | Osterlund | 369/59 X |
| 4,791,623 | 12/1988 | Deiotte | 360/48 X |
| 4,792,937 | 12/1988 | Picard | 360/48 X |
| 4,939,598 | 7/1990 | Kulakowski et al. | 369/59 X |

FOREIGN PATENT DOCUMENTS

| | | |
|---|---|---|
| 116366 | 8/1984 | European Pat. Off. |
| 122467 | 10/1984 | European Pat. Off. |
| 328240 | 8/1989 | European Pat. Off. |

OTHER PUBLICATIONS

J. B. Shaffer et al., Proceedings of SPIE-The International Society for Optical Engineering, "Data Base and File Management Approach for Large Optical Disc Systems", vol. 421, pp. 20-30, Jun. 1983, Arlington, Va.
S. Christodoulakis, ACM Transactions on Database Systems, "Analysis of Retrieval Performance for Records and Objects Using Optical Disk Technology", vol. 12, No. 2, pp. 137-169, Jun. 1987, New York, N.Y.
J. H. Hoover, Proceedings of SPIE-The International Society for Optical Engineering, "Intelligent Optical Disk Controller Architecture", vol. 421, pp. 10-19, Jun. 1983, Arlington, Va.
K. Itao et al., Eighth IEEE Symposium on Mass Storage Systems, "Magneto-Optical Mass Storage System with 1300 mm Write-One Disk Compatibility", pp. 92-97, May 1987, Tucson. Arz.
F. Stubbs, Electronics & Wireless World, "IBM's PC Filing System", vol. 93, No. 1608, pp. 45-46, Oct. 1986, Sutton, Great Britain.

*Primary Examiner*—Robert L. Richardson
*Attorney, Agent, or Firm*—Stevens, Davis, Miller & Mosher

[57] ABSTRACT

Areas in an optical disk are classified into three categories including file areas, used areas, and erased areas for management purposes. An erasing process to convert a used area into an erased area is executed asynchronously with a writing process, thereby preventing any decrease in data transfer speed due to the effect of the erasing process upon the writing process. On the other hand, the file areas, used areas and erased areas are managed as continuous areas which are designated by the head position and the size or end position of the area. A file is preferentially assigned from an erased area or a used area of a large size. With such a construction, area management, such as an integration of the erased area or the like, can be easily performed. Also, the file can be assigned to the continuous areas, and the access speed can be improved.

4 Claims, 19 Drawing Sheets

FIG. 9(a)

| FILE A | 00 | 01 | 24 | 31 |    |
|--------|----|----|----|----|----|
| FILE B | 02 | 04 | 08 | 08 | 10 |
| FILE C | 03 |    |    |    |    |

FIG. 9(b)

|    | 00 | 01 | 02 | 03 | ~   | 09 |
|----|----|----|----|----|-----|----|
| 00 | 00 | 00 | 00 | 00 | ... |    |
| 10 | 00 | FF | 00 | FF | ... |    |
| 20 | 00 | 00 | 00 | 00 | ... |    |
|    | :  | :  | :  | :  |     |    |
| FF |    |    |    |    |     |    |

FIG. 9(c)

|    | 00 | 01 | 02 | 03 | ~   | 09 |
|----|----|----|----|----|-----|----|
| 00 | 00 | 00 | 00 | 00 | ... |    |
| 10 | 00 | 00 | 00 | 00 | ... |    |
| 20 | FF | 00 | FF | FF | ... |    |
|    | :  | :  | :  | :  |     |    |
| FF |    |    |    |    |     |    |

FIG. 9(d)

| 941 | 942 |
|---|---|
| FILE A | AREA 106 | ~943
| FILE B | AREA 102 | ~944
| FILE C | AREA 100 | ~945

| HEAD ADDRESS | END ADDRESS | ~946

FIG. 9(e)

| START ADDRESS | END ADDRESS | AREA SIZE | |
|---|---|---|---|
| 00 | 100 | 100 | ~951 |
| 180 | 250 | 70 | ~952 |

FIG. 9(f)

| START ADDRESS | END ADDRESS | AREA SIZE | |
|---|---|---|---|
| 250 | 400 | 200 | ~961 |
| 800 | 10000 | 9200 | ~962 |

FIG. 17(a)

| 1700 | 1701 | 1702 | 1703 | |
|---|---|---|---|---|
| 0 0 | FILE A | AREA 101 | AREA 103 | 1711 |
| 0 0 | FILE B | AREA 102 | | 1712 |
| 0 0 | FILE C | AREA 104 | | 1713 |
| 0 1 | FILE A | AREA 105 | | 1714 |
| 0 1 | FILE C | AREA 106 | | 1715 |

| HEAD ADDRESS | END ADDRESS |
|---|---|

FIG. 17(b)

| STATUS (1800) | HEAD ADDRESS (1801) | END ADDRESS (1802) | SIZE (1803) | |
|---|---|---|---|---|
| 0 0 | 450 | 10000 | 9550 | 1811 |
| F F | 450 | 600 | 150 | 1812 |
| F F | 600 | 800 | 200 | 1813 |
| 0 0 | 0 0 | 100 | 100 | 1814 |
| 0 0 | 180 | 250 | 70 | 1815 |
| 0 0 | 250 | 450 | 200 | 1816 |

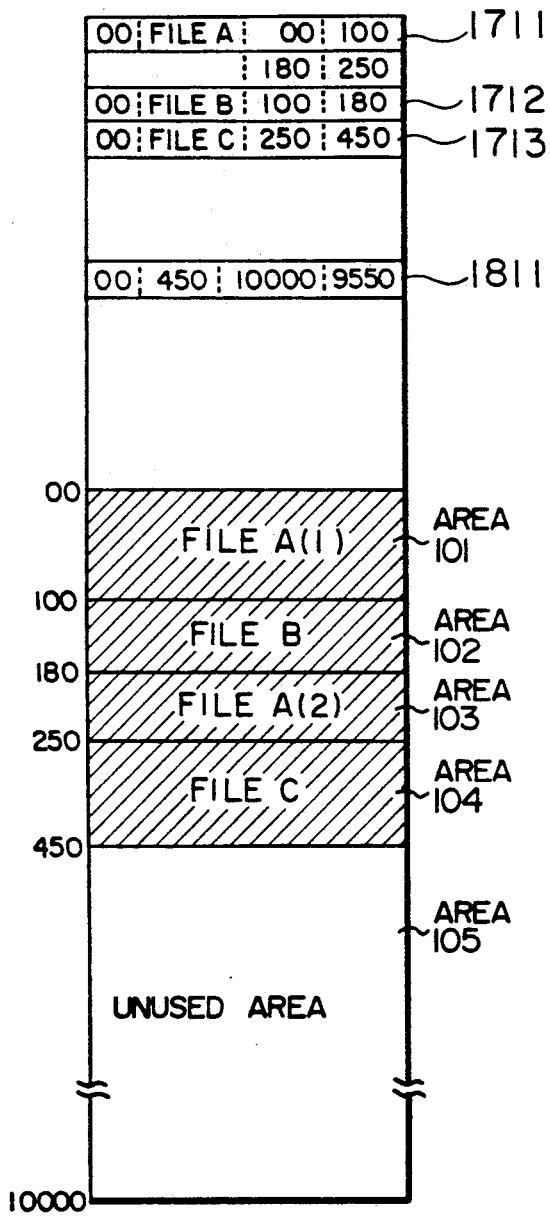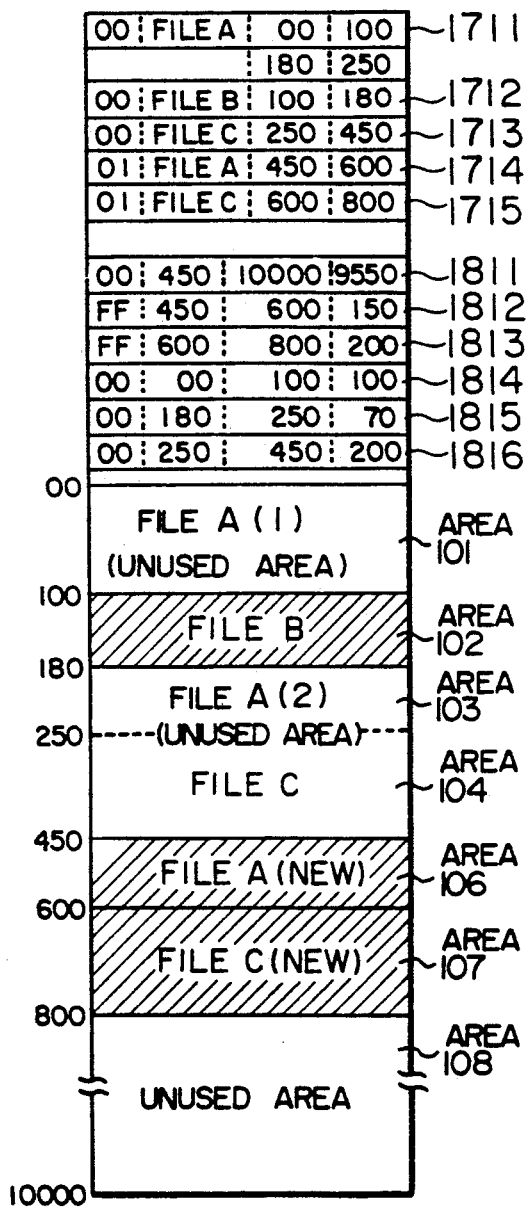

RECORDING AREA MANAGEMENT SYSTEM FOR WRITABLE TYPE OPTIONAL DISK

BACKGROUND OF THE INVENTION

The present invention relates to an optical disk which is used to a record data and, more particularly, to system and method for managing recording areas on a writable type optical disk which is used in a data file apparatus or the like for a computer.

Hitherto, as an external memory medium for a computer, a writable magnetic recording medium such as floppy disk, hard disk, or the like has been used. In recent years, the use of an optical disk having a large memory capacity of hundreds of megabytes or more has begun as an external memory medium for a computer. On the other hand, in association with the advancement of the optical disk technique, the use of not only the read only type or WORM type optical disk but also the writable type optical disk has been studied.

The phase transition type optical disk and the magneto-optical disk have been developed constitute present writable type optical disks. However, such disks have several problems. Particularly, there are problems such that the overwriting technique is not completed yet, the reliability of the disk is not very high, the seeking time is long (the access speed is slow), and the like. With respect to the overwriting technique, the development including the phase transition type optical disk has progressed somewhat. However, it does not reach the practical use stage yet. In the present technique, the processing speed is slow because in order to rewrite data, the system must wait until the disk rotates once to erase the data which has already been written, and thereafter, new data is rewritten.

On the other hand, the slower seeking time as compared with that in the case of the magnetic medium becomes a large cause of employing the necessity of a managing system different from that for the magnetic medium as a managing system of the optical disk. Further, in terms of reliability as well, there remains a problem of deterioration of the disk such that a difference of error rate occurs due to the frequent rewritting operations, or the like.

As an example of an application as an external memory device for a computer, a managing system similar to that for the ordinary magnetic medium is used from an operating system by using the rewritable characteristic.

A managing system of the magnetic medium type will now be described with reference to FIGS. 3 and 4. In the managing system of the magnetic medium type, the area in the medium is divided into a plurality of areas of a predetermined size and the areas are managed by using a table for recording the connecting state of a discontinuous file which exists in the blank area or a plurality of areas every area. Each of the areas is constructed on a block unit basis of a fixed length size of ordinarily about a few kilobytes. FIG. 3 shows such a table comprising file area management information 312 to record files and blank area management information 311 to manage the recordable blank areas. File name managing means 308 manages the file recording blocks on the basis of the file area management information 312. Recording position deciding means 309 decides the recording position on the basis of the blank area management information 311 in the case where a file is additionally recorded. Since data can be overwritten onto the magnetic medium, there is no need to wait for the rotation of the disk to erase as in the case of the optical disk. Therefore, the operating system has no need to discriminate whether the area to record a file is the area which has previously been used or the area from which data has already been erased (including a virgin area). The recording position deciding means 309 assigns the blank area to record a file by using an algorithm shown in FIG. 4.

In step 401 in FIG. 4, the blank areas are sequentially searched from the low address side by using the blank area management information 311. In step 402, on the basis of the result of step 401, if a blank area exists, step 403 follows and if no blank area exists, this is considered as indicating that a recording error occurs due to the area overflow, and the processing routine is finished. In step 403, the overwriting into the blank area searched in step 401 and the verification are instructed to an optical disk control section 306. In step 404, a check is made to see if the whole file has been recorded, or not. If a not-recorded portion still exists, the processing routine from step 401 is repeated.

However, the problem of the processing speed occurs in the case where the algorithm of FIG. 4 is applied to the writable type optical disk in which the overwriting operation cannot be performed. In the algorithm of FIG. 4, the blank area which needs the erasing process and has previously been used on the low address side is preferentially assigned. Therefore, the recording processing speed becomes slow as compared with the case of assigning the blank area from which data has already been erased on the high address side.

Further, according to the magnetic medium type managing system, since the blank areas are managed on a block unit basis, in particular, there is a problem of the recording area management such as release or reuse of the recording area. For instance, the released blank blocks of a small size discretely exist due to the deletion, addition, or the like of the file. In the case of newly adding a file to the medium in such a using state, in general, the operating system searches the blank block from the low address side and sequentially records a part of the file, so that the file is divided into a plurality of blocks and discretely exists in the medium.

On the other hand, in the optical disk of a slow access time, it is desired to continuously record data. This is because the reproducing processing efficiency can be fairly improved since the extra seeking operation is prevented and a plurality of sectors can be read out in a lump upon reproduction of the file. Therefore, in the managing method of the magnetic medium type, there are problems such that the file content is distributed, it takes a time to move the head or to rotate the disk upon reading of the file, the reproducing processing speed becomes extremely slow, and the like, so that such a method is improper as a managing system of the optical disk.

In addition, in the case of also commonly using the magnetic medium type managing system, a problem of deterioration of the disk also occurs. For instance, each time the file is updated, the rewriting operations frequently occur for the fixed area in which area management information or the like is recorded. Therefore, the number of rewriting times of only a special block in the optical disk remarkably increases, the difference of frequency of the local rewriting operations occurs, and such a difference can easily become a cause of the difference of error rate. Particularly, the significant information such as area management information to manage the whole optical disk is frequently recorded in the fixed area on the medium in order to first read out such information when the system is set. If such management information is obstructed, there is a great risk that the whole medium cannot be used.

SUMMARY OF THE INVENTION

It is an object of the present invention to provide system and method for managing recording areas of a writable type optical disk which can avoid the problem of the overwriting of the writable type optical disk, the problem of the decrease in access speed due to the cause of the discrete recording of a file, and the problem of the reliability of the optical disk due to the difference of the frequency of the local rewriting operation.

To accomplish the above object, according to the invention, the use state of each area in the optical disk is classified into three states of the using area into which valid data is recorded, the used area in which invalid data is recorded, and the erased area from which data has already been erased and into which new data can be rewritten, and the management is performed.

When the file is assigned, the algorithm to preferentially select from the erased area by the recording position deciding means is used. On the other hand, if the erased area to record a file lacks, the erasing process of the used area or the integrating process (garbage correction) of the erased area is executed. The integrating process has erased area making means for making the erased area by using the idle time of the processes or the like. By the above construction, the characteristic such that overwriting cannot be executed is covered and the recording processing speed can be improved.

In addition, the invention can also further use the following construction as a construction to solve the problem of the frequency of the rewriting operations for only the special area. The file system has therein: a converting section to convert the hysteresis information as recording information of the updating content in the optical disk into the format of area information (using file entry, list of unused areas); and a memory to store the converted area information. For the change of the area information in association with the updating of the file or the like, the area information in the memory is directly updated and the hysteresis information indicative of the change content is written into the erased area or used area in the optical disk. Therefore, there is no need to rewrite the area information in the optical disk. The area information in the memory is recovered to the newest form and loaded by the converting section with reference to the hysteresis information in the optical disk when the optical disk is exchanged. According to the above method, the number of rewriting times for the special area on the optical disk is reduced and the problem of the reliability due to the deterioration of the optical disk and the like can be solved.

Further, the invention comprises: a file entry to discriminate the file recorded area in the optical disk; and a file system to manage data on a file unit basis by using an unused area list indicative of the recordable area. The area designation information in the file entry in the management information is described by the head of the area and the size or end position of the area for one or more continuous areas. The allocation of the file is preferentially executed from the unused area of a large size. With such a construction, the simple area management such as integration of the unused areas or the like can be performed and the file can be assigned to the continuous areas and the reproducing processing speed can be improved.

BRIEF DESCRIPTION OF THE DRAWINGS

FIGS. 9(a), 9(b), and 9(c) show examples of area information in the case of managing the areas on a block unit basis of a fixed length;

FIGS. 9(d), 9(e), and 9(f) show examples of area information in the case of managing the areas on a unit basis of continuous areas of a variable length;

FIGS. 17(a) and 17(b) show examples of area information in the case of using the hysteresis information; and FIGS. 18(a) and 18(b) show practical examples of the updating of a file in the case of using the hysteresis information.

DESCRIPTION OF THE PREFERRED EMBODIMENTS

A system and method for managing recording areas of a writable type optical disk in an embodiment of the present invention will be described with reference to FIGS. 1, 2, and 5 to 18.

Figure 1:
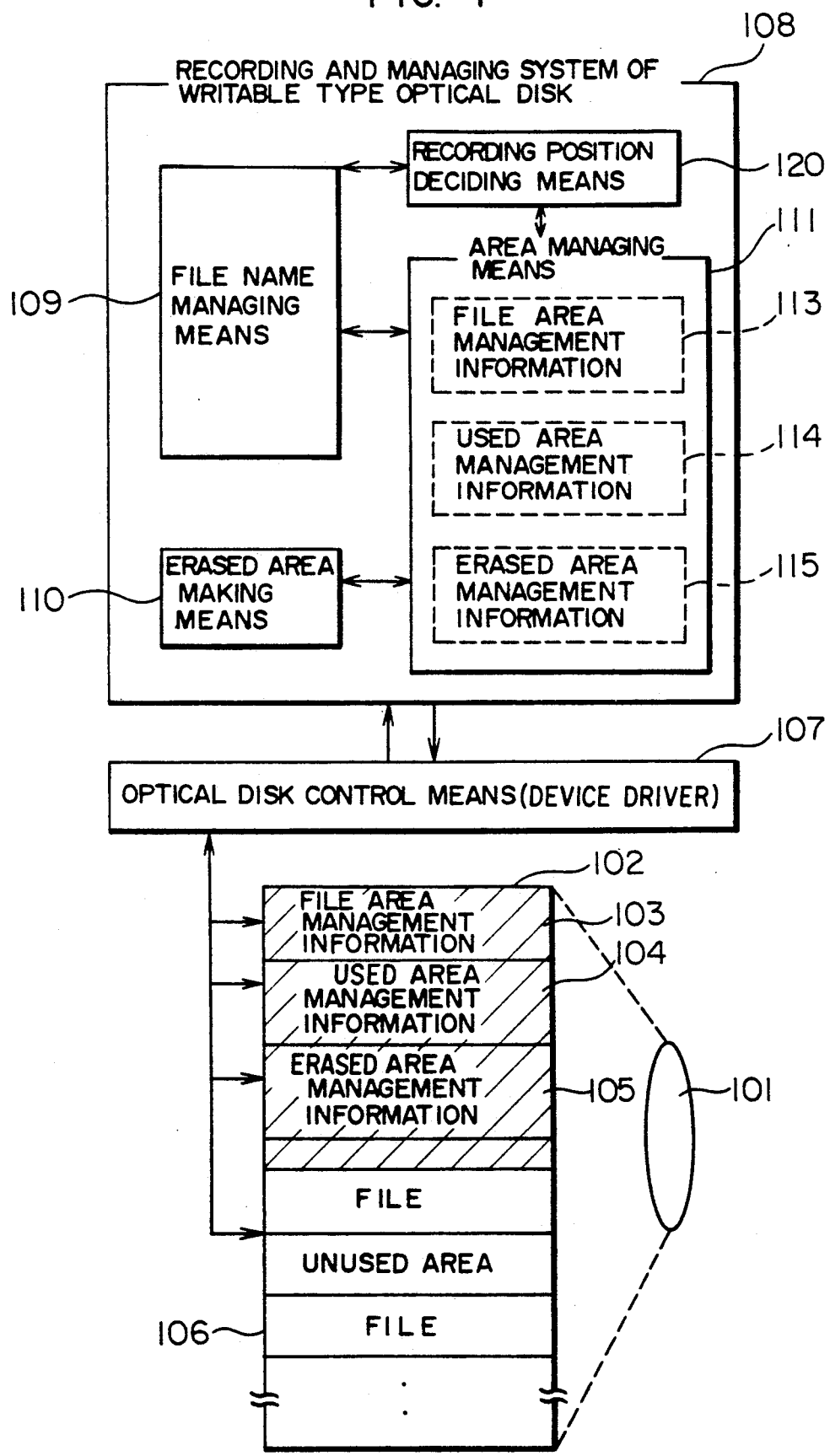
FIG. 1 is an arrangement diagram of a writable type optical disk recording managing system according to an embodiment.

In FIG. 1, reference numeral 101 denotes an optical disk and 102 indicates management information (hatched portion) of data in the optical disk 101. The management information 102 comprises: file area management information 103 to manage the recording areas of a file in the optical disk; used area management information 104 to manage the areas in which the deleted invalid data is recorded; and erased area management information 105 to manage the recordable areas from which data have already been erased. Reference numeral 106 denotes a file layout example in the optical disk; 107 indicates optical disk control means to record, reproduce, and erase for the optical disk 101; and 108 represents a writable type optical disk recording and managing system to manage the optical disk 101. Reference numeral 111 denotes area managing means for managing the management information 102 in the optical disk 101. In general, if the management information 102 is read out of the optical disk 101 each time it is referred to, the processing speed decreases. Therefore, in many cases, the management information 102 is buffered into a high speed storage medium such as a memory or the like and is referred to therein. In FIG. 1, the management information buffered by the area managing means 111 is shown as file area management information 113, used area management information 114, and erased area management information 115. The writable type optical disk recording managing system 108 includes: recording position deciding means 120 for deciding the recording position of the file by using the used area management information 114 and erased area management information 115; and file name managing means 109 for discriminating the recording position of a file by the file area management information 113. Reference numeral 110 denotes erased area making means which uses the idle time of the operating system or the like and is made operative asynchronously with the recording timing of the file. Means 110 performs the erasing process of the used areas and the garbage correction of the used areas or erased areas which were distributed and prepares for the next recording process (hereinafter, referred to as an integrating process).

The present invention is characterized by the algorithm for the file recording process in the embodiment by the recording position deciding means 120 in FIG. 1 in order to preferentially assign from the erased area and the algorithm for the activating process and its integrating process of the erased area making means 110 which is activated asynchronously with the recording timing of the file and executes the erasing process of the used area. Such algorithms will now be sequentially explained hereinbelow.

Figure 2:
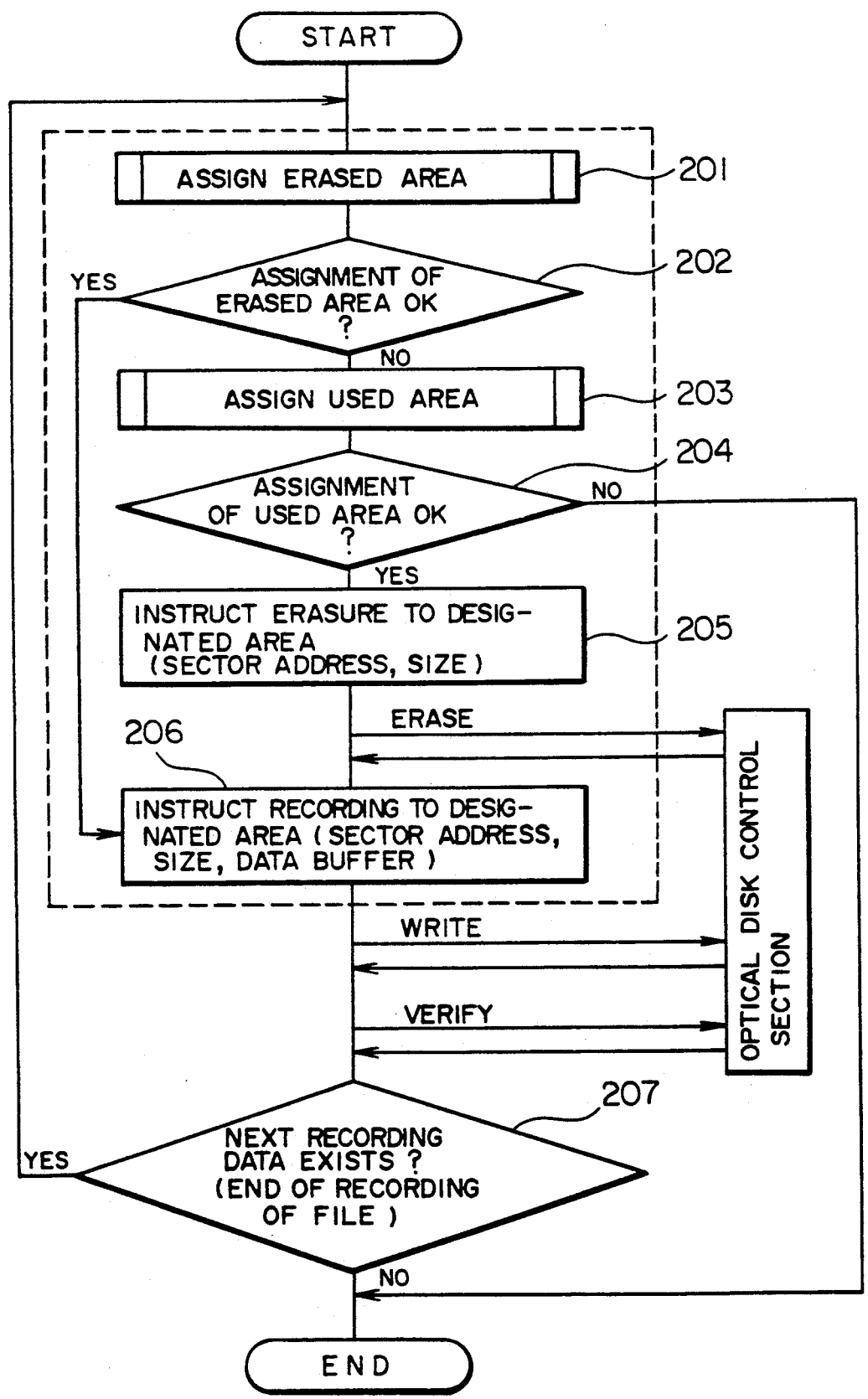
FIG. 2 shows an algorithm for a file recording area in the embodiment.
Figure 3:
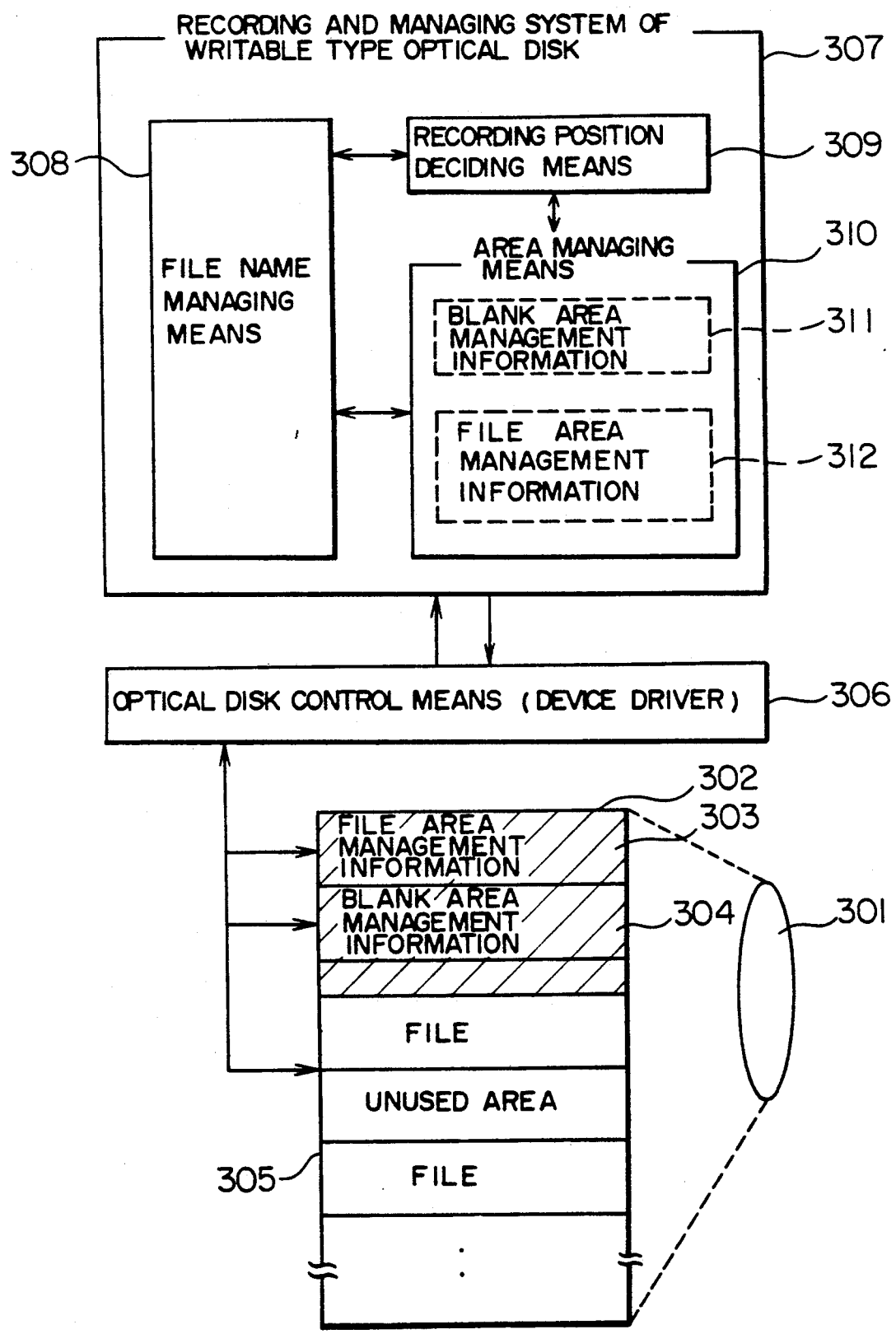
FIG. 3 is an arrangement diagram (magnetic medium type) of a writable type optical disk recording managing system of a conventional example.
Figure 4:
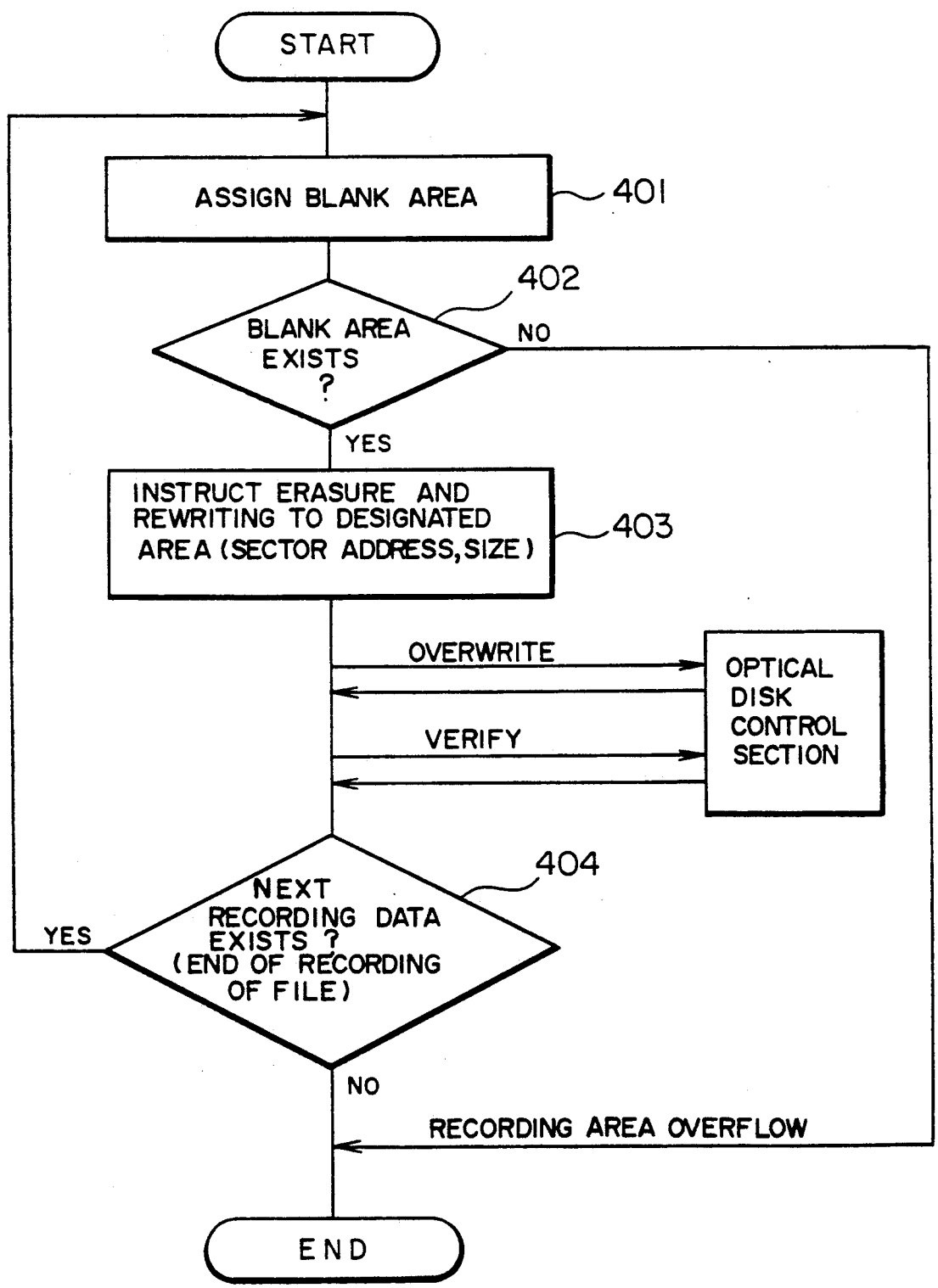
FIG. 4 shows an algorithm (magnetic medium type) for a file recording area of a conventional example.
Figure 8:
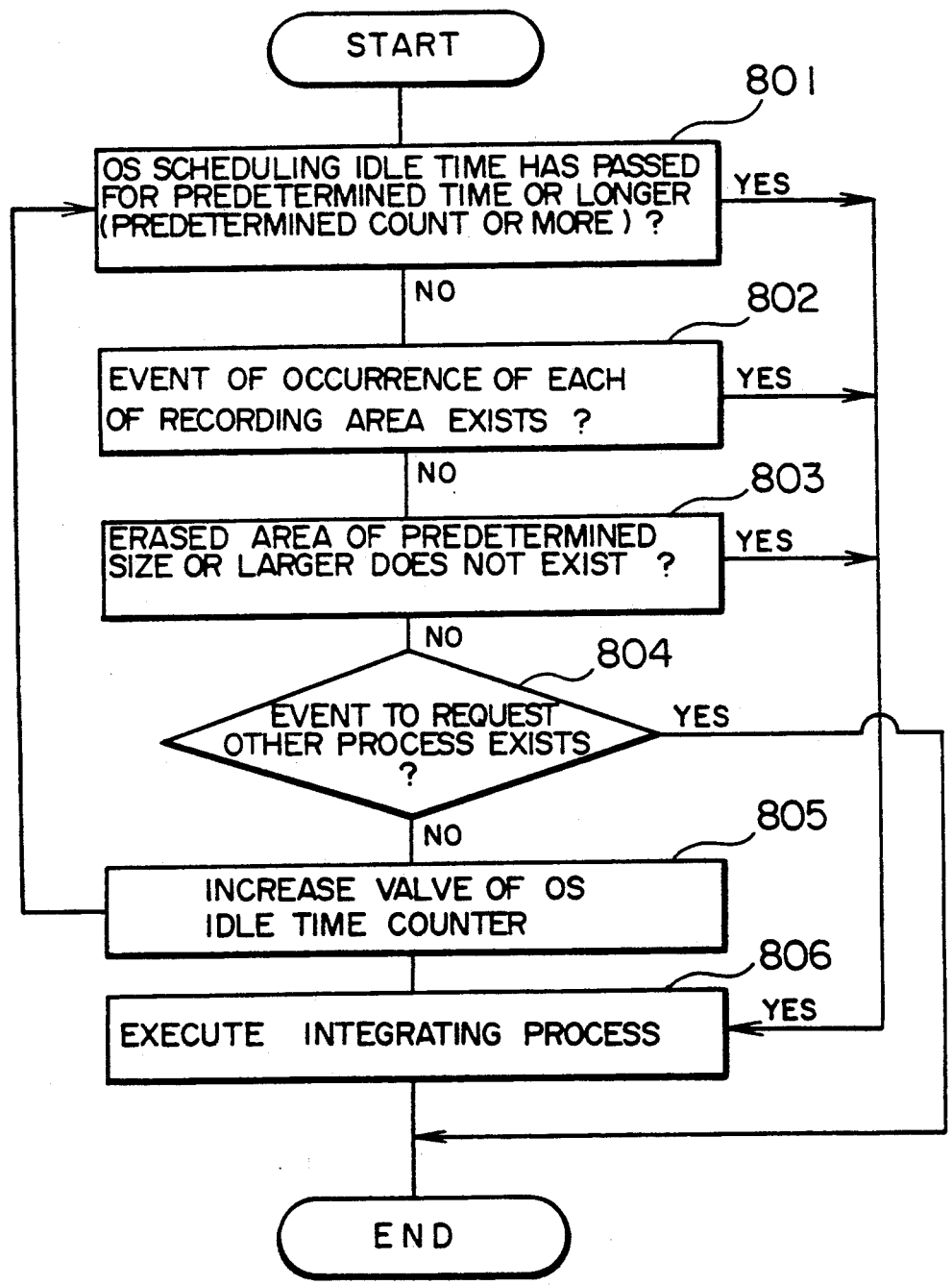
FIG. 8 shows an example of a method of discriminating the activation of the integrating process by erased area making means.

FIG. 2 shows the algorithm to decide the file recording position in the embodiment by the recording position deciding means 120 in FIG. 1. In step 201 in FIG. 2, the optimum erased area is selected from the erased area management information 115. In step 202, on the basis of the result of step 201, if the erased area exists, step 206 follows. If no erased area is assigned, step 203 follows. In step 206, the overwriting and verification for the recording area decided in step 201 are instructed to the optical disk control section 107. In step 203, in place of the erased area, the optimum used area is selected from the used area management information 114. In step 204, on the basis of the result of step 203, if a used area exists, step 205 follows. If no used area exists, the processing routine is finished by regarding that the recording error occurs due to the recording area overflow. In step 205, the erasing process of the recording area decided in step 203 is performed by the erased area making means 110 and step 206 then follows. Further, in step 207, a check is made to see if the whole file has been recorded or not. If any unrecorded portion still exists, the processing routine from step 201 is repeated. On the other hand, in the erased area making means 110, the discrimination with respect to the activation of the integrating process shown in the algorithm of FIG. 8 is executed in parallel. Therefore, when the recording area overflows, the integrating process is activated. After completion of the integrating process, the recording process of the file is again performed.

The details of the algorithms for the discrimination of the optimum areas in steps 201 and 203 and the discrimination of the activation, of the integrating process will be described below with reference to FIGS. 5 to 8 and 9 to 15 showing examples of the algorithms.

As explained above, according to the embodiment, as shown in the construction of FIG. 1, the use state of each area in the optical disk is classified into three states constituting a using area, used area, and erased area and is managed accordingly. When a file is assigned, the algorithm to preferentially select from the erased area is used for the recording position deciding block as shown in FIG. 2. By using such a construction, the problem in the magnetic medium type managing system such that the recording processing speed is slow in the overwriting mode can be improved.

Figure 5:
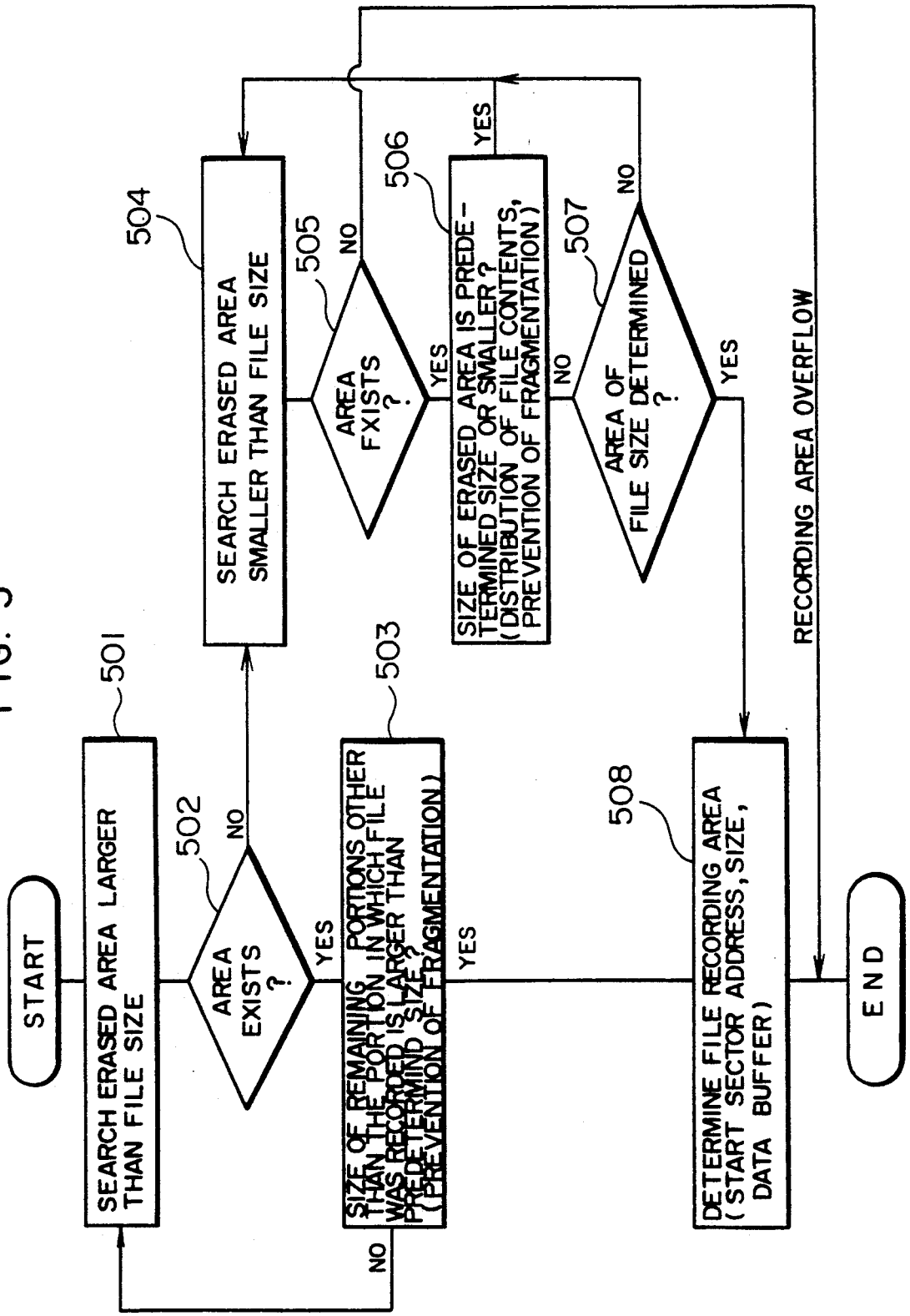
FIG. 5 shows an example of an area assigning algorithm of erased areas in the embodiment.
Figure 6:
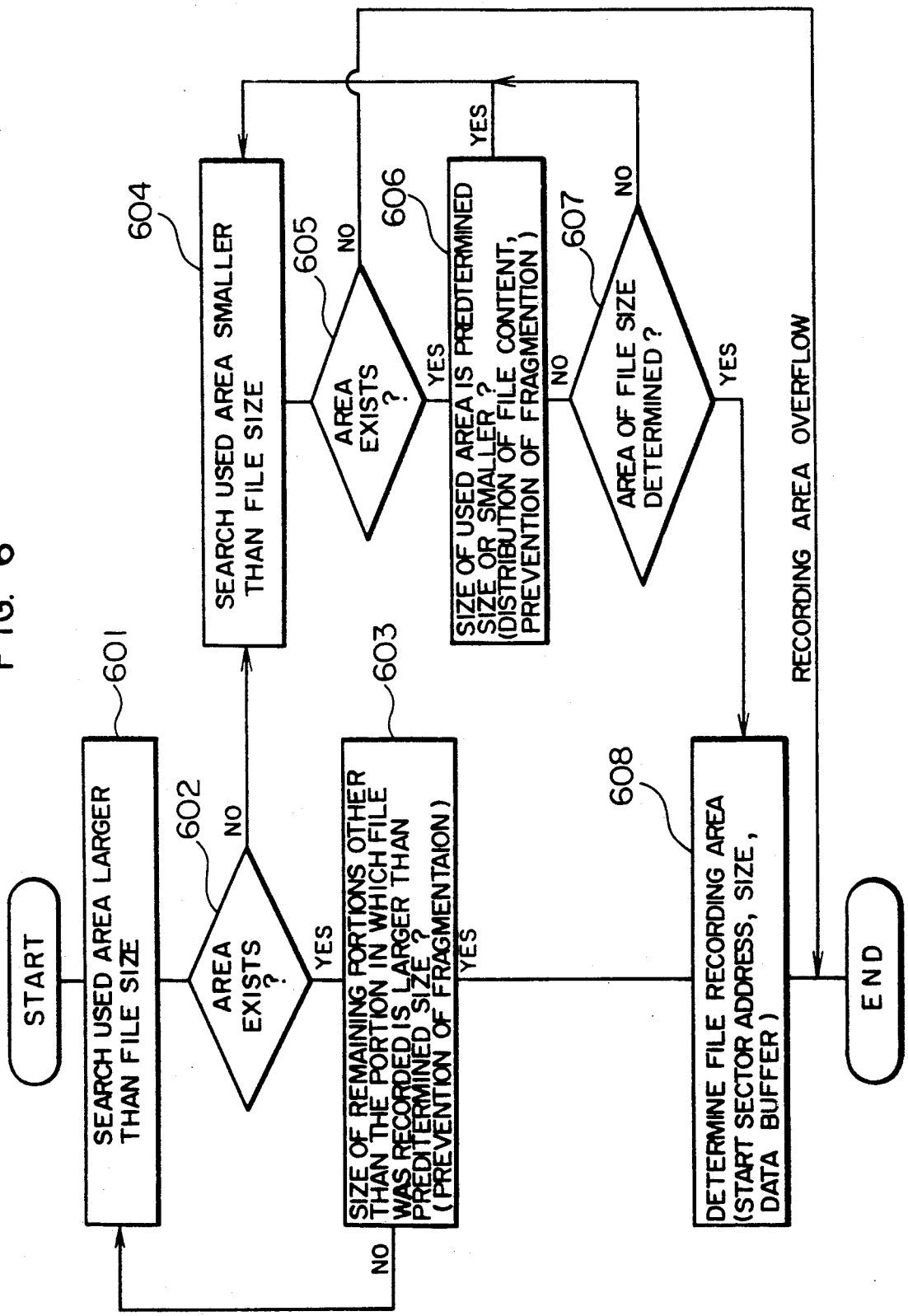
FIG. 6 shows an example of an area assigning algorithm of used areas in the embodiment.

FIGS. 9 to 15 show practical examples in the case of recording a file by the algorithms of FIGS. 5 and 6. FIG. 9 shows examples of the file area management information 103 or 113, erased area management information 105 or 115, and used area management information 104 or 114 in FIG. 1. FIGS. 9(a), 9(b), and 9(c) show the examples in the case of managing each area on a block unit basis of a fixed length. FIGS. 9(d), 9(e), and 9(f) show the examples in the case of managing the area of a variable length by the start address and size or end address. In the optical disk of a slow access speed, it is desirable to continuously record the content of the file. From this viewpoint, as compared with the cases of FIGS. 9(a) to 9(c) where the file content is distributed on a block unit basis, it is more desirable to use the area management by the variable length in the cases of FIGS. 9(d) to 9(f) where the file can be recorded on a unit basis of large continuous areas. Therefore, FIGS. 10 to 15 describe the cases of FIGS. 9(d) to 9(f) where the areas of a variable length are managed.

FIG. 9(d) shows the file area management information 103 or 113. Reference numeral 941 denotes a file identifier (file ID) to discriminate a file and 942 indicates area information to record the file content. Actually, each area information is shown by the head address and end address of the area as shown by reference numeral 946. On the other hand, in the case where the file content is separately recorded in a plurality of areas, the areas are shown. For instance, in FIG. 9(d), reference numeral 943 denotes an example in which a file A is recorded in an area 106. Similarly, reference numerals 944 and 945 show that files B and C are recorded in areas 102 and 100.

FIG. 9(e) shows the example of the used area management information 104 or 114 which is recorded in each of the independent used areas. Reference numeral 951 shows a state in which the start address, end address, and size are recorded with respect to a certain unused area. Reference numeral 952 and subsequent reference numerals also indicate similar states. Although the unused area can be designated by only the start address and end address, by also recording the size, it can be compared with the file size when a file is written and the unused area into which data will be recorded can be selected at a high speed. FIG. 9(f) shows an example of the erased area management information 105 or 115 which is recorded into each independent erased area in a manner similar to FIG. 9(e).

First, the optimum area assigning algorithms of FIGS. 5 and 6 will now be described. In step 501 in FIG. 5, an area larger than the file size to be recorded is searched from the erased area management information. In step 502, if a proper large area is selected in step 501, step 503 follows. If no area can be selected, step 504 follows. In step 503, the difference between the size of the area selected in step 501 with the file size is calculated. When the size of the remaining area after the recording is equal to or smaller than a preset size, the selected area is abandoned and the processing routine is again returned to step 501 and the next area is selected. If the size of the selected area is larger than the preset size, step 508 follows and the recording of the file into the selected area is instructed to the device driver. The discriminating step 503 is provided to prevent the fragmentation phenomenon in which areas of a small size discretely exist. When an erased area larger than the file size cannot be found, the erased area which is equal to or smaller than the file size is searched in step 504. If a proper small erased area is selected in step 504 and the existence of such a proper small erased area is determined in step 505, step 506 follows. If no small erased area can be selected, the processing routine is finished by regarding that the recording area overflows. Then, the processing routine advances to the selecting routine of an unused area. If the size of the selected area is equal to or smaller than the preset size in step 506, the selected area is abandoned and the processing routine is again returned to step 504 and the next area is selected. If the size of the selected area is larger than the preset size, step 507 follows. In step 507, a check is made to see if the area of the file size has completely been selected or not. If the result is NO in step 507, step 504 follows and the next area to record the remaining portion of the file is searched. The optimum value of the preset size which is used as a discriminating condition in steps 503 and 506 is determined in dependence on the sector size of the optical disk or the size of file which is mainly recorded. In general, in the case where the managing system is used to record a file of a large size such as image data or the like, the optimum value of the preset size is set to a large value. On the contrary, when the managing system is used to record a file of a small size such as a text file or the like, it is set to a small value.

In the embodiment, quite the same algorithm is also used with respect to the used area selecting algorithm in FIG. 6. Steps 601 to 608 in FIG. 6 correspond to steps 501 to 508 in FIG. 5. The algorithms in FIGS. 5 and 6 relate to examples in the embodiment. For instance, the conditions can be added or deleted in a manner such that the discriminating condition of step 503 is omitted or the like in accordance with the situation.

FIG. 8 is a diagram explaining an example of the algorithm to discriminate the activation of the integrating process by the erased area making means. In step 801, a check is made to see if the scheduling time of the operating system is a predetermined count or more or less. If it is the predetermined count or more, it is determined to be the idle time of the operating system and step 805 follows and the integrating process is executed. If the scheduling time is smaller than the predetermined count, step 802 follows. Since the integrating process requires a relatively long processing time, it is effective to execute the integrating process asynchronously with the recording of a file by using the idle time or the like of the operating system. In step 802, a check is made to see if an event indicative of the lack of recording area has been generated or not. If YES, step 806 follows. If NO, step 803 follows. In step 803, a check is made to see if no erased area of the preset size or smaller exists or not. If no erased area of the preset size or smaller exists, that is, if the result is YES in step 803, step 806 follows. If NO, step 804 follows. In step 804, after completion of the discriminating steps 801 to 803, a check is made to see if an event to require other process for the operating system has been generated or not. If the result is NO in step 804, step 806 follows and the count value of the scheduling time of the operating system is increased and the processing routine is returned to step 801. If the result is YES in step 804, the process to discriminate the activation of the integrating process is finished and the other process requested is executed.

Figure 7:
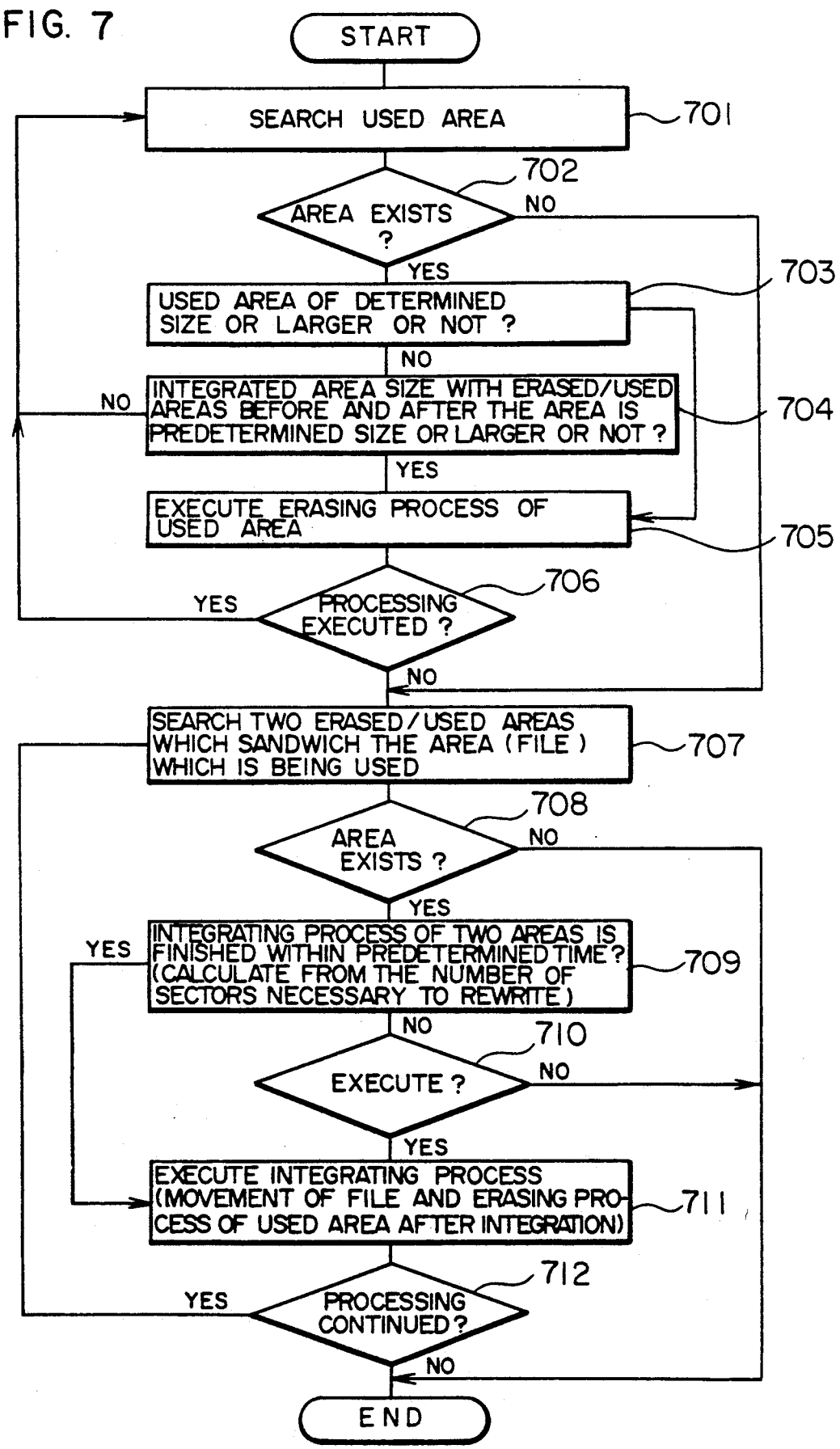
FIG. 7 shows an example of a method of executing an integrating process (garbage collection) of used/erased areas.

An example of the algorithm to select the area to execute the process in the case of the integrating process will now be described with reference to FIG. 7. In FIG. 7, the process is divided into two processes: the erasing process of the used area (steps 701 to 706); and the integrating process of a plurality of discontinuous areas (steps 707 to 713). In step 701, the used area is searched from the used area management information. In the next step 702, the presence or absence of the searched area is discriminated on the basis of the result of step 701. If the used area exists, that is, if the result is YES in step 702, step 703 follows and a check is made to see if the searched used area is a predetermined size or larger or not. If the searched area size is equal to or larger than the predetermined size, step 705 follows. If NO, step 704 follows. In step 704, if the adjacent erased areas before and after the area exist, a check is made to see if the total size of the areas including the adjacent erased areas is a preset size or larger or not. If it is the preset size or more, step 705 follows. If it is smaller than the preset size in step 704, step 701 follows and the next area is searched and the processing routine from step 701 is repeated. In step 705, the erasing process of the used area is executed and the resultant area is transferred from the used area management information to the erased area management information. In the discriminating steps 703 and 704, with respect to the small area smaller than the preset size, since the effect of the execution of the integrating process is small, the integrating process is reserved until the next opportunity, thereby making the response speed of the integrating process high. In step 707, the two adjacent used areas or erased areas are searched. In step 708, if the searched areas exist on the basis of the result of step 707, the processing routine advances to step 709. If NO, the integrating process is finished. In step 709, the time which is required for the integrating process of the two adjacent areas is calculated and if the time is a predetermined time or shorter, step 711 follows and the process is executed. If the time is the predetermined time or longer, step 710 follows. In step 710, a check is made to see if the execution is allowed or not. If YES, step 711 follows. If NO, step 712 follows. For the processing time, the average time can be calculated by counting the number of sectors necessary to move the file which is sandwiched by the two areas. If it is necessary to largely move the file, it takes a fairly long time to remarkably rewrite the data in the optical disk, so that there is a case where an obstruction occurs such that the other processes are stopped. Therefore, it is proper to ask the user or the like to see if the processes should be executed or not before the start of the processes as mentioned above. In step 711, the file is moved and the process to erase the used area after the integration is executed and the processing routine advances to step 712. In step 712, the continuation of the process is inquired. If the process is continued, step 707 follows and the process is executed. If the process is not continued, the integrating process is finished.

Figure 10:
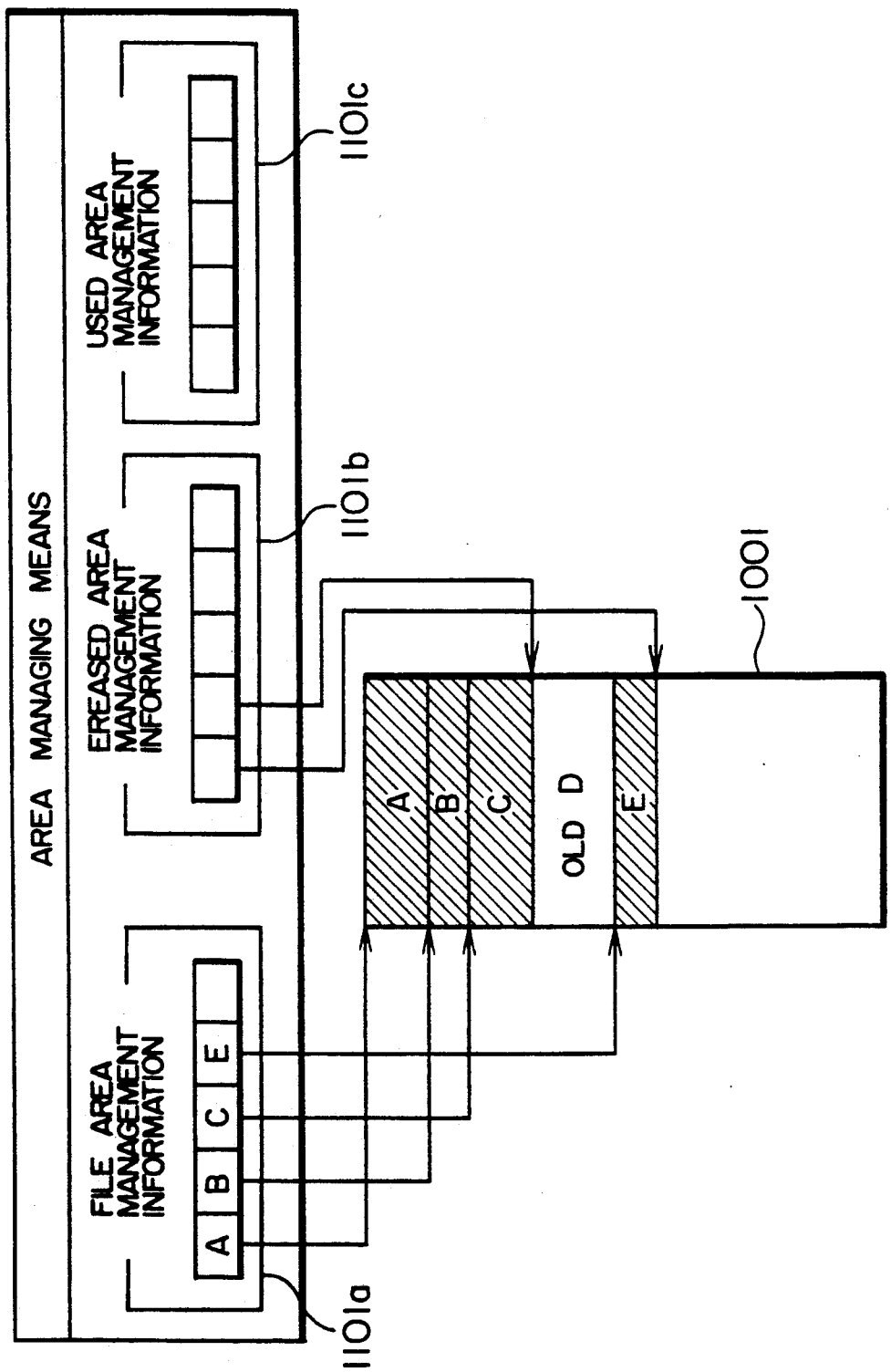
FIGS. 10 to 15 show practical examples of the updating of a file in the embodiment.

An example of the recording of the file using the algorithms of FIGS. 5 and 6 will now be described. In FIGS. 10 to 15, reference numerals 1000 to 1006 denote file layouts in the optical disk 101 in each state. Reference numerals 1101a to 1106a, 1101b to 1106b, and 1101c to 1106c show schematic diagrams of the management information in three areas. Actually, they have the formats of FIGS. 9(d) to 9(f). In each diagram, the simplified block diagram is used and no practical numerical value is shown. The hatched portion in each diagram indicates the using area (file content), the mesh portion represents the used area, and the other portions represent the erased areas. For instance, FIG. 10 shows an example in which the files A, B, C, and E are recorded as the using areas and the portion in which the file D was recorded is erased and managed as the erased area. In the example, the virgin area in which no data is used yet is also handled as an erased area.

Figure 11:
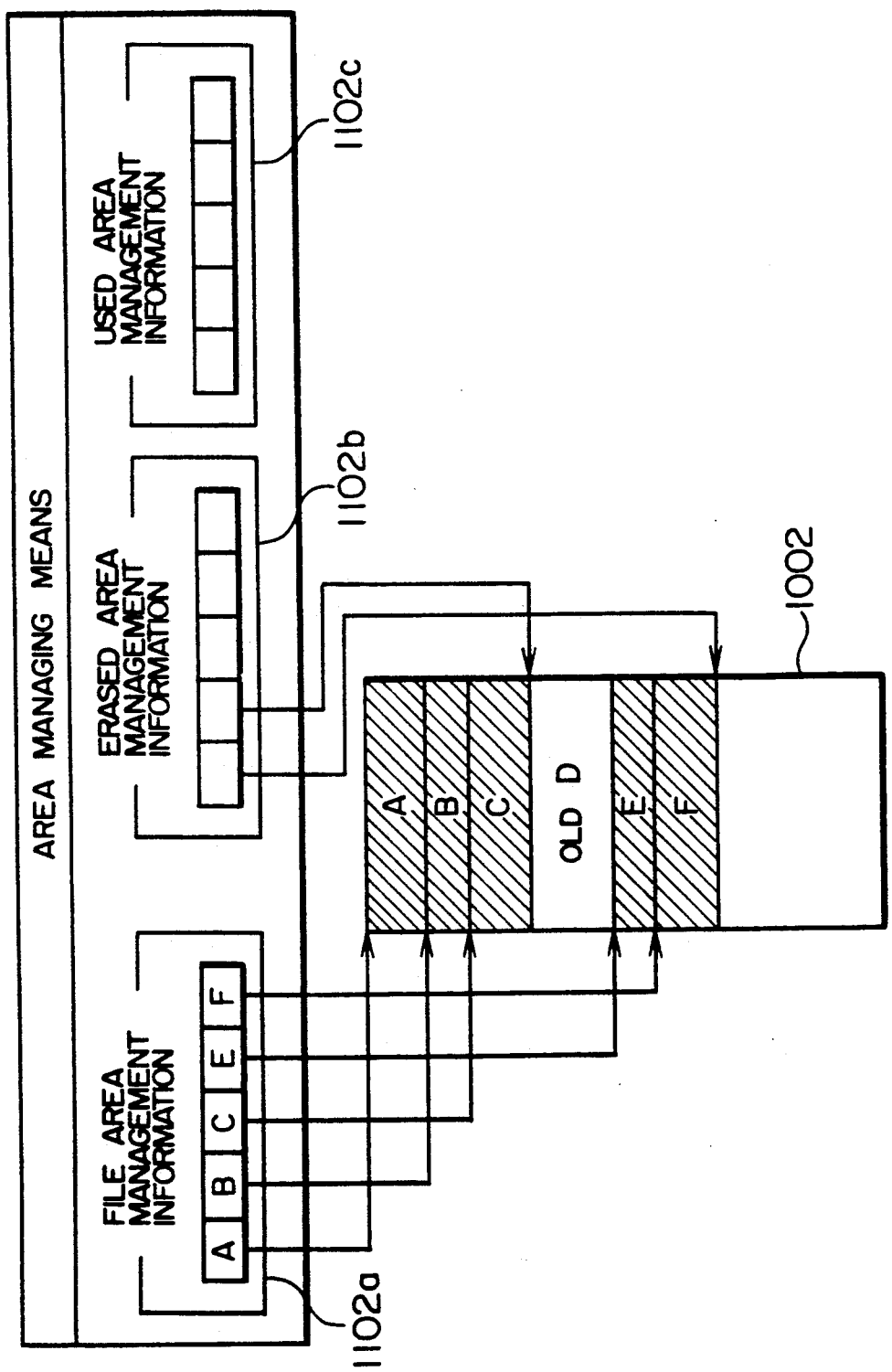

FIG. 11 shows an example in the case of additionally recording the file F into FIG. 10. In accordance with the algorithm of FIG. 5, the area of the old file D smaller than the size of file F is determined to be improper in step 501. The area after the file E is selected and the file F is recorded.

Figure 12:
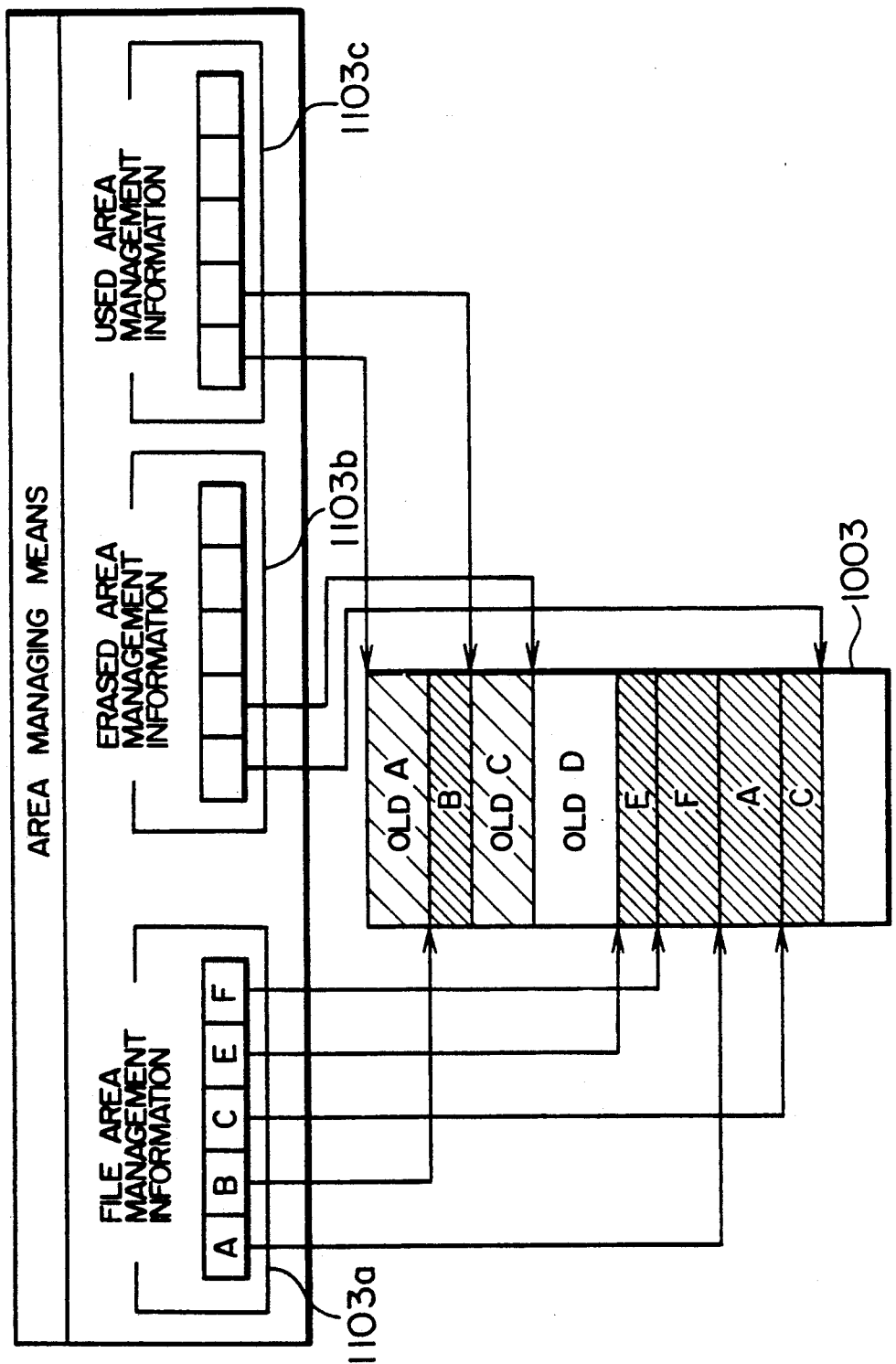
Figure 13:
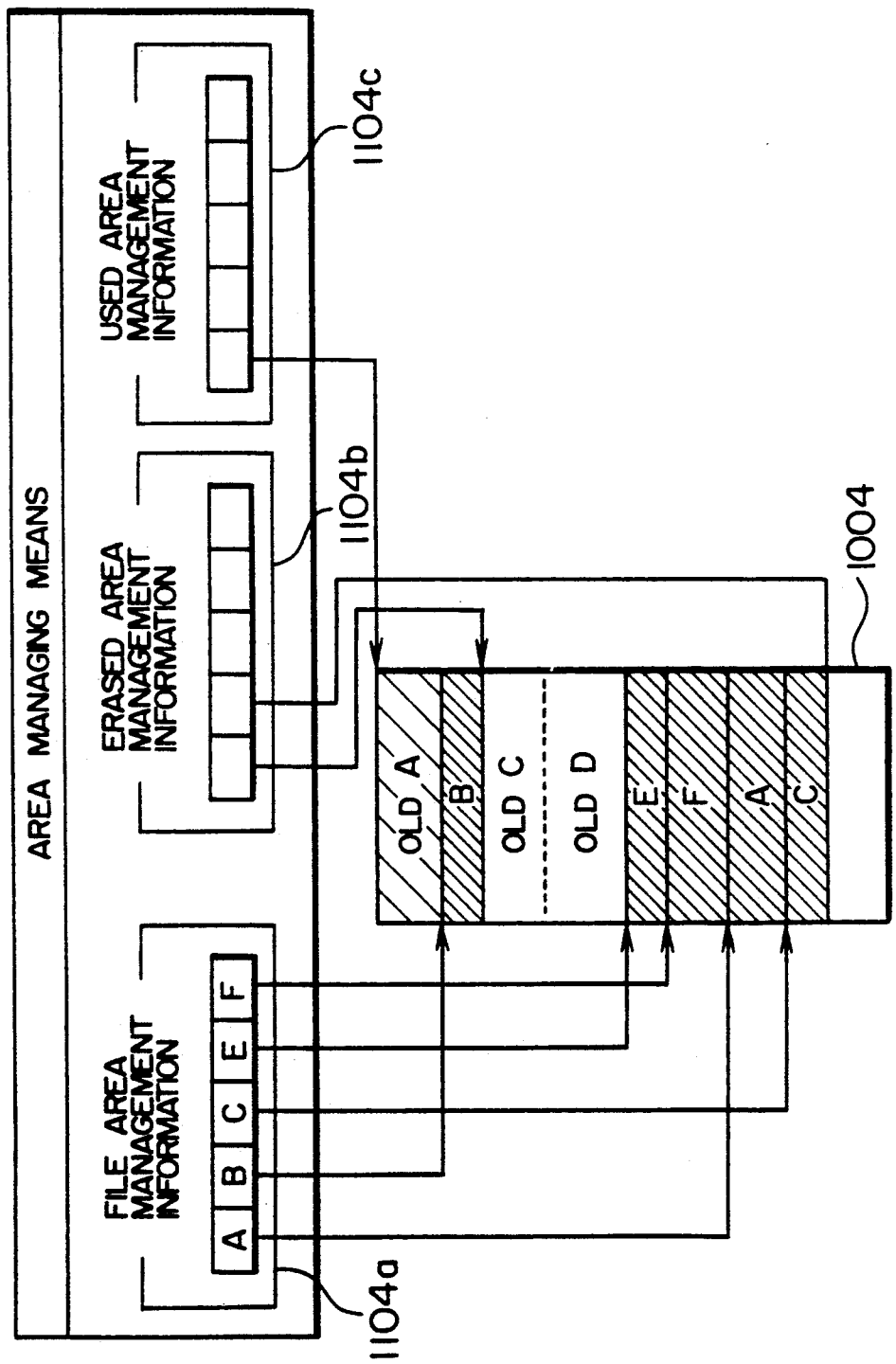
Figure 14:
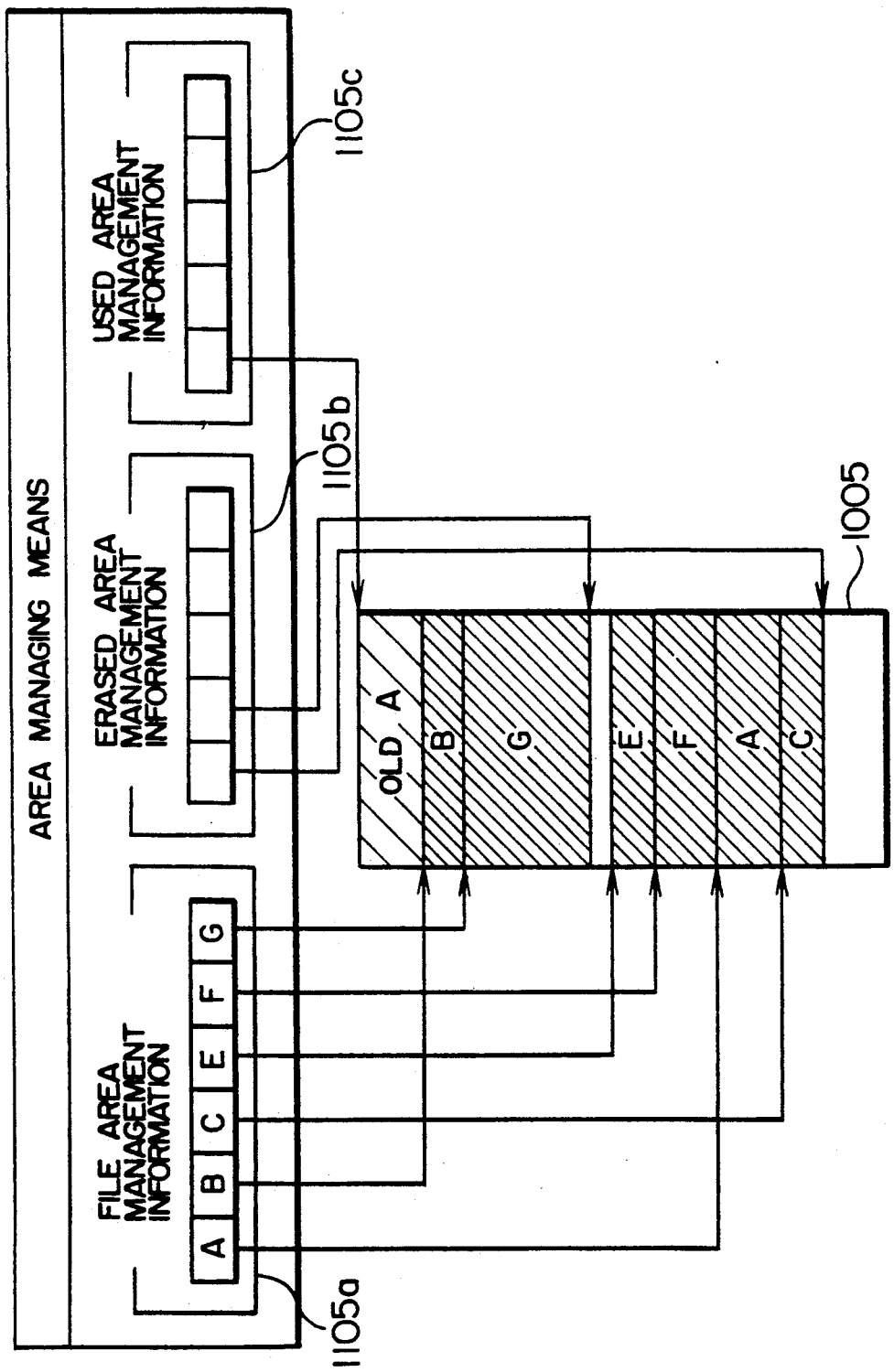
Figure 15:
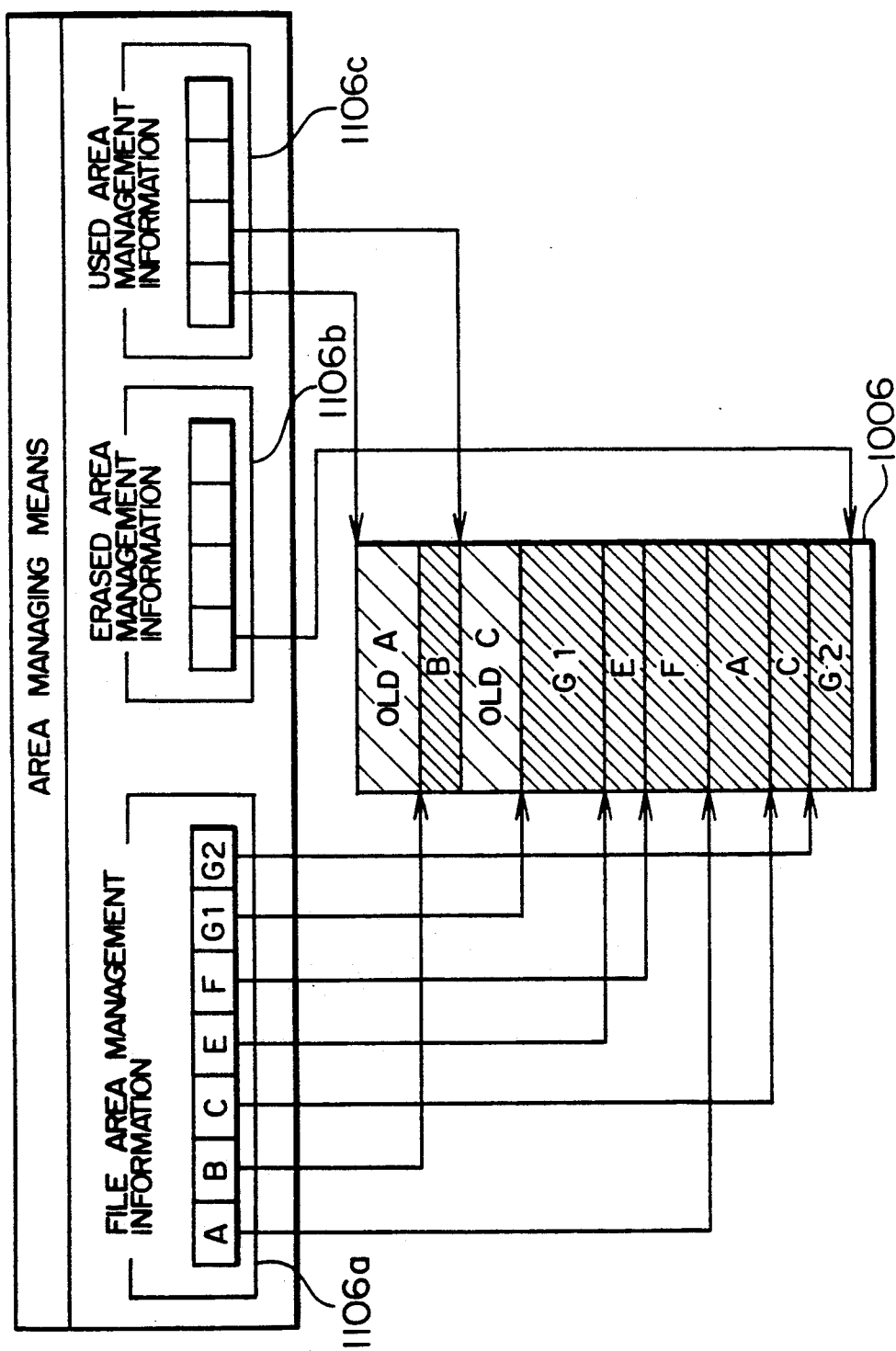

FIG. 12 shows a state in which the files A and C were deleted from the state of FIG. 11. Although the areas in which the files A and C were recorded are released and can be used again, the erasing process is not executed yet and those areas are registered into the used area management information 1103c. Further, FIG. 13 shows an example in the case where the integrating process was activated from the state of FIG. 12. In accordance with the result of step 703 in FIG. 7, the area of the old file A is determined to be improper. On the basis of the result of the discrimination of step 704, the area of the old file C having the adjacent erased area is erased and the resultant area is transferred from the erased area management information 1103b to the erased area management information 1104b. FIG. 14 shows an example in the case where the file G is recorded in addition to the state of FIG. 13. In this case, the integrating process of the areas of the old files D and C is executed and the resultant area is selected in step 501 in the algorithm of FIG. 5 and the file G is recorded. Finally, FIG. 15 shows an example in the case where the file G is recorded in the state of FIG. 12. In this case, since an erased area larger than the file size cannot be selected by steps 501 and 502 in the algorithm of FIG. 5, an erased area which is equal to or smaller than the file size is selected in steps 504 to 507 and divided into two areas and recorded.

An explanation has been made above with respect to the embodiment according to the invention in the case where three management information status involving using area, erased area, and employed area are used and the response speed of the recording process is improved by considering the characteristic such that the overwriting of the optical disk is impossible. An explanation will now be made with respect to an embodiment in the case of improving a problem of the reliability of the optical disk due to the difference of the frequencies of the local rewriting operations as another problem of the optical disk.

In the case where the managing system of the magnetic medium type is used, the blank area management information and file area management information are also recorded into the same medium by setting a predetermined area. Therefore, each time a file is updated, the rewriting operations are frequently executed in such a predetermined area. Such a problem also becomes one of the reasons that the magnetic medium type managing method is improper for the optical disk.

Figure 16:
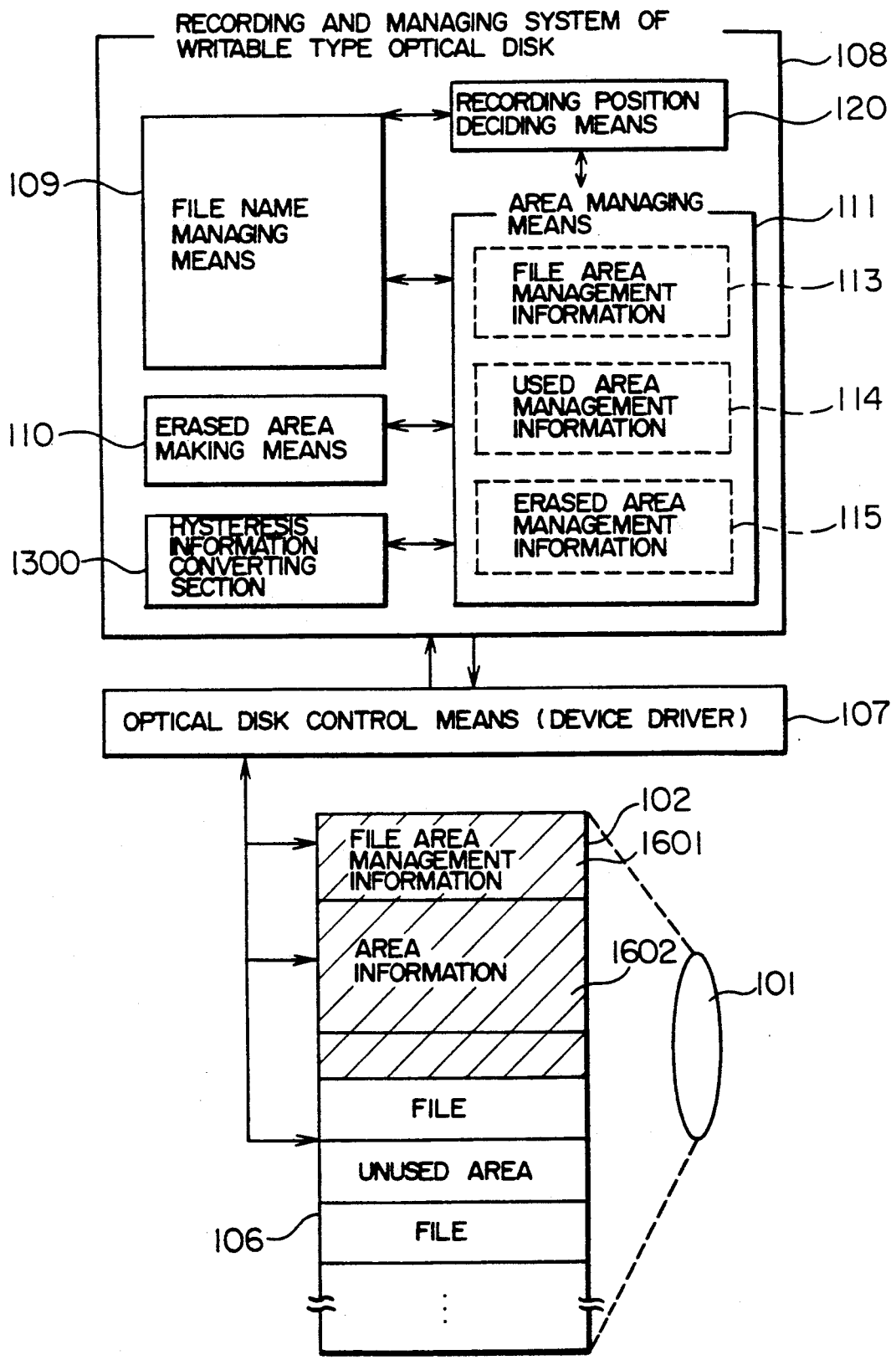
FIG. 16 is an arrangement diagram of the writable type optical disk recording and managing system in the case of updating the management information by using hysteresis information according to the embodiment.

Therefore, in the case of using the optical disk 101 in which the number of rewriting times which is guaranteed by the manufacturer is small, such a problem is avoided by using the construction of FIG. 16.

FIG. 16 shows a construction in which a hysteresis information converting section 1300 is added to FIG. 1. Reference numeral 1601 denotes file information to record the file area management information and the difference information (hereinafter, referred to as hysteresis information) indicative of the updating content; 1602 indicates area information to record the used area management information and used area management information and their hysteresis information; 1300 represents the hysteresis information converting section for respectively converting the file information 1601 in the optical disk into the format of the file area management information and converting the area information 1602 into the formats of the used area management information and erased area management information and for loading the resultant information into the area managing means 111.

FIG. 17(a) shows an example of the format of the file information 1601. FIG. 17(b) shows the example of the format of the area information 1602. FIGS. 17(a) and 17(b) show the case of FIG. 18(b) where the files A and C were deleted from FIG. 18(a) and the erasing process was executed. Reference numerals 1711 to 1715 in FIG. 17(a) denote hysteresis information of the file management information; 1700 indicates a processing code representative of the content of the updating process; 00 shows the making of a file; FF a deletion of a file; 01 the updating of a file. Reference numeral 1701 denotes a file identifier and 1702 and 1703 indicate area information in which the file is stored. Each area is shown by the head address and end address. In the case where the file is divided and recorded into a plurality of areas, the areas are shown. In FIG. 17(b), reference numerals 1811 to 1816 denote hysteresis information of the erased area management information; 1800 indicates a status code representative of the status of the unused area; 00 shows the release of an area; and FF indicates that an area was used by the recording of a file. For instance, the hysteresis information 1812 denotes that a file was recorded into the unused area (addresses 450 to 600). In the example, the diagram is shown by assuming that no erased area exists for simplicity of explanation.

FIGS. 17(a) and 17(b) correspond to FIGS. 9(d) and 9(f). In the state of FIG. 18(b), the file area management information and erased area management information which were converted by the hysteresis information converting section 1300 so as to have the same formats as those of the file area management information of FIG. 9(d) and of the erased area management information of FIG. 9(f) are loaded in the area managing means 111.

By updating from the state of FIG. 18(a) to the state of FIG. 18(b), the hysteresis information 1714 and 1715 of the files A and C are recorded in the file information 1601. The hysteresis information 1812 and 1813 indicating that the areas 105 and 106 were used and the hysteresis information 1814, 1815, and 1816 indicating that the areas of the files A and B before updating were released are written into the area information 1602. At this time, the file area management information and blank area management information in the area managing means 111 are also simultaneously updated and rewritten into the formats of FIGS. 9(d) and 9(f).

For instance, even in the case where the use of the optical disk 101 is interrupted and removed in such a state and the optical disk 101 is again used, it is also possible to reconstruct from the file information 1601 and area information 1602 in FIGS. 17(a) and 17(b) recorded on the optical disk 101 to the formats of the file area management information and erased area management information of FIGS. 9(a) and 9(b) before the interruption of the use of the optical disk 101 by the hysteresis information converting section 1300.

As explained above, in the file system 7, immediately after the optical disk was exchanged, the file information 1601 and management information 1602 are converted into the newest file area management information, erased area management information, and used area management information with reference to the hysteresis information by the hysteresis information converting section 1300 and the converted information are stored into the area managing means 111. For the change of the file area management information, erased area management information, and used area management information after completion of the converting process, they are directly changed in the area managing means 111 and managed in the newest, state. For the optical disk 101, those items of information are not rewritten into the same sector but the hysteresis information indicative of the content of the change is written into the file information 1601 and area information 1602. Therefore, the area in the optical disk 101 into which the management information is recorded does not need to be frequently rewritten. The deterioration of the optical disk due to the difference of the frequency of the rewriting operations can be prevented.

However, if the change is frequently performed, an amount of hysteresis information in the optical disk increases and there occurs a case where the converting processing speed upon exchange of the optical disk becomes slow. Therefore, there is executed a saving process in which the file information 1601 and area information 1602 in the optical disk at a certain time point are rewritten into the formats of the newest file area managing information 113, used area management information 114, and erased area management information 115 in the area managing means 111 at that time point. The updating after the saving process can be executed by writing the hysteresis information from the newly rewritten file information 1601 and area information 1602 as start points. In particular if the saving process is executed as a process just before the optical disk is exchanged, the converting processing speed when the optical disk is next used can be made high.

What is claimed is:

1. A recording area management system for a writable type optical disk for recording data including at least file data and area management information in a plurality of areas of said optical disk, wherein updating of data is executed by erasing old data from said optical disk and thereafter recording new data to said optical disk, said area management information including a size information and an identifier for each area, said identifier representing one of (a) an area in use to which active file data has been recorded, (b) a used area occupied by inactive file data and (c) an erased area from which inactive file data has been erased, said system comprising:

an optical disk unit comprising an erasing mechanism for erasing old data from said optical disk and a recording mechanism for recording new data to said optical disk;

a recording position deciding means for:

allocating an area of the optical disk to a new file data to be recorded by selecting the area with priorities in the order of (a) a first priority corresponding to any erased area having a size which is equal to or larger than the size of the new file data, (b) a second priority corresponding to a used area having a size which is equal to or larger than the size of the new file data, and (c) a third priority corresponding to an erased area and a used area abutting each other and having a total size which is equal to or larger than the size of the new file data, where the used area selected in accordance with said third priority is a used area having a smallest size among a plurality of used area abutting an erased area to yield a total size equal to or larger than the size of the new file data, executing recording of the new file data to the allocated area by means of said recording mechanism, and generating and recording a new area management information corresponding to the newly recorded area and having an identifier representing an area in use; and erased area making means for converting a used area to an erased area by means of said erasing mechanism only when a predetermined condition is met, and for generating and recording a new area management information corresponding to the newly erased area and having an identifier representing an erased area, wherein said predetermined condition is that there exists a used area whose size is equal to or smaller than a predetermined size for which conversion of a used area to an erased area by said erasing mechanism can be completed within a time interval for data recording set by the recording area management system at one of (i) a time when an inspection is carried out periodically and (ii) a constant time after a recording operation is performed by means of said recording mechanism.

2. An area management system according to claim 1, wherein said predetermined condition further includes that said used area having said size equal to or smaller than said predetermined size abuts an erased area, and said erased area making means, after converting said used area having said size equal to or smaller than said predetermined size to an erased area, integrates the newly converted erased area with said erased area, and generates and records a new area management information corresponding to the integrated erased area.

3. A recording area management system for a writable type optical disk for recording data including at least file data and area management information in a plurality of areas of said optical disk, wherein updating of data is executed by erasing old data from said optical disk and thereafter recording new data to said optical disk, said area management information including a size information and an identifier for each area, said identifier representing one of (a) an area in use to which active file data has been recorded, (b) a used area occupied by inactive file data and (c) an erased area from which inactive file data has been erased, said system comprising:

an optical disk unit comprising an erasing mechanism for erasing old data from said optical disk and a recording mechanism for recording new data to said optical disk;

a recording position deciding means for:

allocating an area of the optical disk to a new file data to be recorded by selecting the area with priorities in the order of (a) a first priority corresponding to an erased area having a size which is equal to or larger than the size of the new file data, (b) a second priority corresponding to an erased area and a used area abutting each other and having a total size which is equal to or larger than the size of the new file data, where the used area selected in accordance with said third priority is a used area having a smallest size among a plurality of used areas abutting an erased area to yield a total size equal to or larger than the size of the new file data and (c) a third priority corresponding to a used area having a size which is equal to or larger than the size of the new file data, executing recording of the new file data to the allocated area by means of said recording mechanism, and generating and recording a new area management information corresponding to the newly recorded area and having an identifier representing an area in use; and erased area making means for converting an used area to an erased area by means of said erasing mechanism only when a predetermined condition is met, and for generating and recording a new area management information corresponding to the newly erased area and having an identifier representing an erased area, wherein said predetermined condition is that there exists a used area whose size is equal to or smaller than a predetermined size for which conversion of a used area to an erased area by said erasing mechanism can be completed within a time interval for data recording set by the recording area management system at one of (i) a time when an inspection is carried out periodically an (ii) a constant time after a recording operation is performed by means of said recording mechanism.

4. An area management system according to claim 3 wherein said predetermined condition further includes that said used area having said size equal to or smaller than said predetermined size abuts an erased area, and said erased area making means, after converting said used area having said size equal to or smaller than said predetermined sized to an erased area, integrates the newly converted erased area with said erased area, and generates and records a new area management information corresponding to the integrated erased area.

* * * * *